(12) United States Patent
Tang

(10) Patent No.: US 10,402,880 B2
(45) Date of Patent: Sep. 3, 2019

(54) SYSTEM AND METHOD FOR PEER VIRTUAL FITTING

(71) Applicant: Grace Tang, Newark, CA (US)

(72) Inventor: Grace Tang, Newark, CA (US)

( * ) Notice: Subject to any disclaimer, the term of this patent is extended or adjusted under 35 U.S.C. 154(b) by 335 days.

(21) Appl. No.: 15/456,287

(22) Filed: Mar. 10, 2017

(65) Prior Publication Data

US 2017/0270581 A1  Sep. 21, 2017

Related U.S. Application Data

(63) Continuation-in-part of application No. 14/153,000, filed on Jan. 11, 2014.

(60) Provisional application No. 62/308,229, filed on Mar. 15, 2016.

(51) Int. Cl.
*G06Q 30/06* (2012.01)
*G06Q 30/02* (2012.01)

(52) U.S. Cl.
CPC ..... *G06Q 30/0621* (2013.01); *G06Q 30/0282* (2013.01); *G06Q 30/0633* (2013.01); *G06Q 30/0643* (2013.01)

(58) Field of Classification Search
CPC ........................................................ G06N 3/006
USPC ......................................................... 705/26.5
See application file for complete search history.

(56) References Cited

U.S. PATENT DOCUMENTS

2011/0298897 A1* 12/2011 Sareen .................. G06N 3/006
348/47

* cited by examiner

*Primary Examiner* — Russell S Glass

(57) ABSTRACT

In a multimedia device, a method, apparatus, and system for image processing and virtual outfitting experience(s) sharing, where in provider(s) and user(s) are associated in like-mind groups, offering and sharing their virtual fitting image(s), setting(s), component(s) and/or experience(s), based on their personal preference(s) and/or style(s); means for said system to process image(s) and simultaneously virtual outfit a plurality of users in group(s) at the same time; means for said system to facilitate said sharing in a continuous way through data, image and/or multimedia information data feeds; and means for said system to organize, manage and maintain a plurality of said virtual outfitting item(s), image(s), data, provider(s), user(s), group(s), relationship(s) and/or etc., as a self-sustaining peer virtual outfitting community.

22 Claims, 7 Drawing Sheets

SYSTEM AND METHOD FOR PEER VIRTUAL FITTING

This application claims benefit of provisional Application No. 62/308,229, filed Mar. 15, 2016, and is also a continuation-in-part of application Ser. No. 14/153,000, filed Jan. 11, 2014.

BACKGROUND OF THE INVENTION

1. Field of the Invention

This invention relates generally to touch screen mobile/phone/tablet/TV application system. More particularly, the invention relates to system and method for image processing and peer virtual outfitting experience(s) and/or service(s).

2. Description of Prior Art

For users, browsing through virtual fitting items, find the ones they like, select said items and instantly virtually try on said items with users' photos and images, is an entertaining experience. This create a novice personal experience that users otherwise would not have access to without said virtual fitting system. Said system also gives users a more enjoyable and personalized shopping experience. Quite often users would like to share said experience with other users, or family members and friends, and get their feedback regarding their new looks with said virtual outfit. This helps the users decide whether said outfit and/or items fit them well, and make their purchase decisions.

At the same time, users like to receive styling advice from people with refined fashion taste, such as stylists or fashion gurus, and get their help on how to outfit themselves to have better and/or trendy looks.

SUMMARY OF THE INVENTION

My invention creates a virtual fitting system and method for users to search and discover virtual outfitting items, associate themselves with groups of people who has likemind styles and preferences, and receive virtual outfitting items, resources, experiences and/or services from other people. Said system enables providers to offer virtual outfitting experiences and/or services to plurality of users in groups. It enables users to receive, review, comment, customize, buy, exchange and/or share virtual outfitting items, images, outfitting experiences and products with other people in groups.

In a multimedia device, a method, apparatus, and system for displaying virtual outfitting item(s) and/or image(s) to user(s); enabling user(s) to upload and manage photo(s), definite the way(s) they would like to be outfitted with, and receiving outfitting experience(s) and/or service(s) offered by provider(s) that make available in said system.

A system and method for user(s) to associate themselves in groups, creating a way for provider(s) to offer similar virtual fitting experiences and/or service(s) to said group(s) of user(s); enable user(s) to receive, review, comment, customize, buy, exchange and/or share virtual outfitting item(s), image(s) and/or experience(s) in group(s). A system and method for providers to process image(s), simultaneously virtually outfitting a plurality of users in group(s) at the same time.

For example, a user is looking to design her new look for a party that she is going to participate. She takes a few pictures of herself, create and setup her profile using said system. She uploads her photos into said system, specifies her preferences such as her height, size, colors and styles she like and etc. She uses said system to outfit herself with placeholders using the photos she has uploaded, save the settings. She specifies the types of virtual try-on items she would like to receive, and the criteria on how she would like to receive outfitting experiences and/or services.

She then searches for groups using said system that shows the outfits, styles and/or photos that she like, and add herself into and/or follow said selected groups.

By adding herself into said selected groups, said user receives continuous feed of new virtual try-on items, and outfitting experiences and services provided in said groups.

The stylist(s), fashion designer(s), guru(s) and/or group leaders who contribute to said selected group(s) regularly upload new virtual try-on items, and provide outfitting experiences to users in their groups.

A fashion designer has a new dress she would like to introduce the market. She takes a picture of said new dress, process the image using said system, and creates a virtual try-on item for said new dress. Said fashion designer is a group leader in several groups in said system, and has her group leader profile in said groups.

Said fashion designer adds this virtual try-on item to said selected groups. She then use said system to select and/or filter the users who are members in said selected groups, find the ones who maybe interested in the dress. She use said system to adjust said new outfitting item, simultaneous virtually outfitting all the users who have criteria specified for and/or include said new virtual try-on item. She then requests the system to deliver said virtual try-on item and/or virtual outfitting image(s) to all said selected users in said selected groups.

Said user mentioned earlier is a member in one of the group where said fashion designer is a group leader. Said group leader has virtually outfitted said user's photo with said new virtual try-on item, and said user receives a notification from said system regarding said new outfitting result. Said user opens her user panel, and views said virtual outfitting result image created by said fashion designer and/or group leader. Said user likes the outfitting result, and she is convinced that the new dress will suites her well, because she has seen the visual result of how she will look like wearing said dress. She places an order with said fashion designer for said dress using said system. Said fashion designer receives the order, produces the dress based on said user's size and preference, and ships said dress to said user's home address.

Using said system, said fashion designer also located a local service provider who geographically locates near said user's home address, and can help said user to adjust the dress in case said user needs additional customer service. Said fashion designer shares said local service provider's information with said user using said system. Said user is satisfied with her purchase of said new dress. She receives a new fashionable dress fits her style really well, and also receives high quality customer services from both the fashion designer and the local service provider, that ensures said dress fits her body well.

Said fashion designer, said local service provider and said user maintain a on-going relationship using said system, and are part of a self-sustaining virtual outfitting community supported by said system.

The system can be used by providers to manage and process image(s), add virtual outfitting item(s), create outfitting image(s) for user(s), and/or offering outfitting service(s) using said system.

The system offers the means for user(s) to upload and manage their own photo(s), discover and virtually outfit themselves with virtual outfitting item(s) make available for outfitting in said system. It offers the means for user(s) to definite the way(s) they would like to be outfitted with, using the virtual outfitting item(s), and receiving outfitting experience(s) and/or service(s) make available in said system. It provides means for said user(s) and provider(s) to form group and/or a plurality of group(s), based on the criteria(s) set and defined for said group(s), including but not limited to: the setting(s), dimension(s), color(s), style(s), pricing(s), brand(s), source(s), provider(s) and etc. It provides means for user(s) and/or provider(s) to add, remove, associate and/or disassociate themselves with group(s).

The system let said user(s) to browse through a plurality of virtual outfit item(s) and/or outfitting image(s), created and offered by one and/or a plurality of provider(s). It provides means for said user(s) to select, follow and/or receive continuously outfitting image(s) and service(s) from said provider(s). It provides the means for said user(s) to follow and/or unfollow provider(s) and/or outfitting image(s) and/or service(s) offered by said provider(s). It offers means for said user(s) to review, provide rating, comment, like, dislike, and share their feedback with said provider(s). It provides means for said user(s) to review, rate, comment, like, dislike, share their feedback with other user(s) within said group(s).

The system provides means for provider(s) to manage and process image(s), add virtual try-on item(s), create outfitting image(s), and/or offering outfitting experience(s) and/or service(s) to said user(s) in said group(s) using said system. It provides means for said provider(s) to simultaneously outfitting image(s) of a plurality of user(s) in the same group, using predefined criteria and setting(s). It provides means for said provider(s) to offering similar outfitting experience(s) and/or service(s) simultaneously to a plurality of user(s) in said same group. It provides means for said provider(s) to provide and deliver outfitting image(s), experience(s) and/or service(s) to group(s) of user(s) in a continuous way. It provides means for said provider(s) to create virtual try-on item(s), add said try-on item(s) to the system, adjust said try-on item(s) using predefined criteria and/or setting(s), simultaneously rendering, delivering, and/or distributing outfitting image(s), experience(s) and/or service(s) to group(s) of user(s), using said new virtual try-on item(s).

The system offers means for said user(s) to receive feeds of outfitting image(s), experience(s) and/or service(s) from said provider(s) in a continuous way. The system offers means for said user(s) and/or provider(s) to share said outfitting item(s), image(s), and/or group(s), along with message(s), data, website address, url links, user interface elements such as buttons and etc, through social media networks and/or other data communication channels. It offers means for said shared outfitting image(s), message(s) and/or file(s) are embedded with data, links, buttons and/or other clickable elements; so that upon receiving said file(s), other users can click on them, and open, view, and/or join said outfitting group(s).

The system offers means for users of said group(s) to find and elect user(s) who has outstanding taste, style, or favored by substantial members of the group, and promote them as group leader(s); said group leader(s) can recommend virtual outfit item(s), experience(s), service(s) and etc to members of said group, and receive privilege and/or rewards as group leader(s).

They system provides means for said provider(s) to sell products and/or services, request survey, inquiry user feedback, seek customization request(s) and/or etc from user(s) through said system. It also provides means for said user(s) to purchase products and/or services, enter customization request, redesign item(s), enter review(s), comment(s) and feedback and/or communicate with provider(s) through said system. The system can generate reports for data received, processed and managed on said system, helping to consolidate and manager users feedback and/or requests, and improve the products to better suite the requirements of the users. Said system can also interact with or be part of a point of sale system, facilitating in the sales process.

The system provides means to organize, manage and maintain a plurality of said user(s), provider(s), group(s) and etc., as a self-sustaining virtual outfitting community.

The system can be used to assist users to view and review outfits of other user(s), input comments, likes, recommendations and etc for said other user(s).

The system can be used to assist providers to view and review outfits of other user(s), input comments, likings, recommendations and etc for said other user(s).

The system can be used to assist users to search for group(s) they would like to be associate with, add themselves to said group(s), and receive outfitting experience shared within said group(s).

The system can be used to assist users to promote user(s) who has outstanding taste, style, or favored by substantial members of the group, and promote them as group leader(s). Said group leader(s) can recommend item(s), experience(s), service(s) and etc to members of said group, and receive privilege and/or rewards as group leader(s).

The system offers the way for one or a plurality of provider(s) to create a group, setup and define the guidelines and criteria of said group, so that predefined types of virtual try-on items are offered with in said group, and certain outfitting experience and/or services are offered within the group and etc.

The system offers the way for one or a plurality of provider(s) to create a plurality of groups, each group offers different guidelines and criteria of outfitting items, experience, services and etc.

The system offers the way for one or a plurality of users to search, discover and add themselves to one or a plurality of groups, each offers different guidelines and criteria of outfitting items, experience, services and etc.

Providers to virtually fit personal items such as clothes and accessories including but not limited to purse, belt, hat, necklace, shoes, watch, jewelry, etc. Apparel, such as clothes, watch, jewelry and etc, can be positioned graphically as desired with the image of the user, thus generates a visual effect of virtual fitting. The images may be provided with high resolution, cropped, resized, rotated, stretched, zoomed, compressed and etc to create the visual result for the virtual fitting.

The virtual fitting system is also used to generate visual result for fitting other types of products to user's environment, through image processing and generation. For example, said system can be used for providing virtual interior design and/or home decoration service(s), landscape design service(s), wall art design service(s), building decoration service(s) and etc. Said system may be used for providing virtual outfitting service(s), personal styling service(s), personal shopping service(s) and etc.

According to still another aspect, the virtual fitting system can display and/or virtual fit a plurality of products in an efficient manner.

According to still another aspect, the virtual fitting can collect and accumulate user input data, manage this data by data consolidation, processing, filtering, formatting and/or etc, and render a summarized representation of the data using charts, tables, diagrams, graphical images, reports and/or etc. This summarized representation of the data can be viewed through the reporting module of the virtual fitting system. This summarized representation of the data can also be saved in digital format such as a file, database and etc, and transferred through an automatic or manual process, through wiring or wireless network and etc. This summarized representation of the data can also be printed out through printers for representation, as well as presented through other representation media for review and display.

According to still another aspect, the virtual fitting system can facilitate users to place in user feedbacks and customized orders for products. Providers can present products that are available and/or not yet available on the market, as well as templates or prototypes of products to users through the virtual fitting system. User can review and/or preview these products, leave reviews, feedbacks, and ratings for the product items. Users can also customize and redesign the products based on his/her style and preference. The virtual fitting system collects the user input data from users, manage and process this data by data consolidation, processing, filtering, formatting and/or etc, and transfer the data to providers. Users can also place in orders or preorder products with or without customizations through the virtual fitting system.

The virtual fitting system includes camera(s), touch screen display(s), processor(s), memory(s) and sensor(s). The system may also include units such as media storage, battery, input and output units, if not combined as part of another unit of the virtual fitting system. The system may also include an external display unit such as a TV, projector and/or etc.

The camera captures the images of the wearable product as well as images from the user, such as the body, face, hand and etc. The processor generates a plurality of matrices used and processes the images. The data storage stores the data and images, and the touch screen display units display graphic user interface and handles user interaction. The external display unit provides additional graphical displays to the user, potentially, on a large display surface.

According to one aspect, the virtual fitting system can be a portable media device also function as a solid-state drive for data storage. The form factor of the virtual fitting system can be hand-held and portable, or it can be a graphical display device with computation capability such as a touch screen TV. The virtual fitting system can also include a peripheral bus connector, a rechargeable battery, and one or more input and output devices. According to another aspect, the virtual fitting system has the capability to store media in persistent memory. Thereafter, when the virtual fitting system is again powered up, the stored media and data can be retrieved and utilized. According to still another aspect, the virtual fitting system can form, display and/or traverse image assets in an efficient manner.

BRIEF DESCRIPTION OF THE DRAWINGS

For a more succinct understanding of the nature and objects of the present invention, reference should be directed to the following detailed description taken in connection with the accompanying drawings in which.

DETAILED DESCRIPTION OF THE INVENTION

Figure 1:
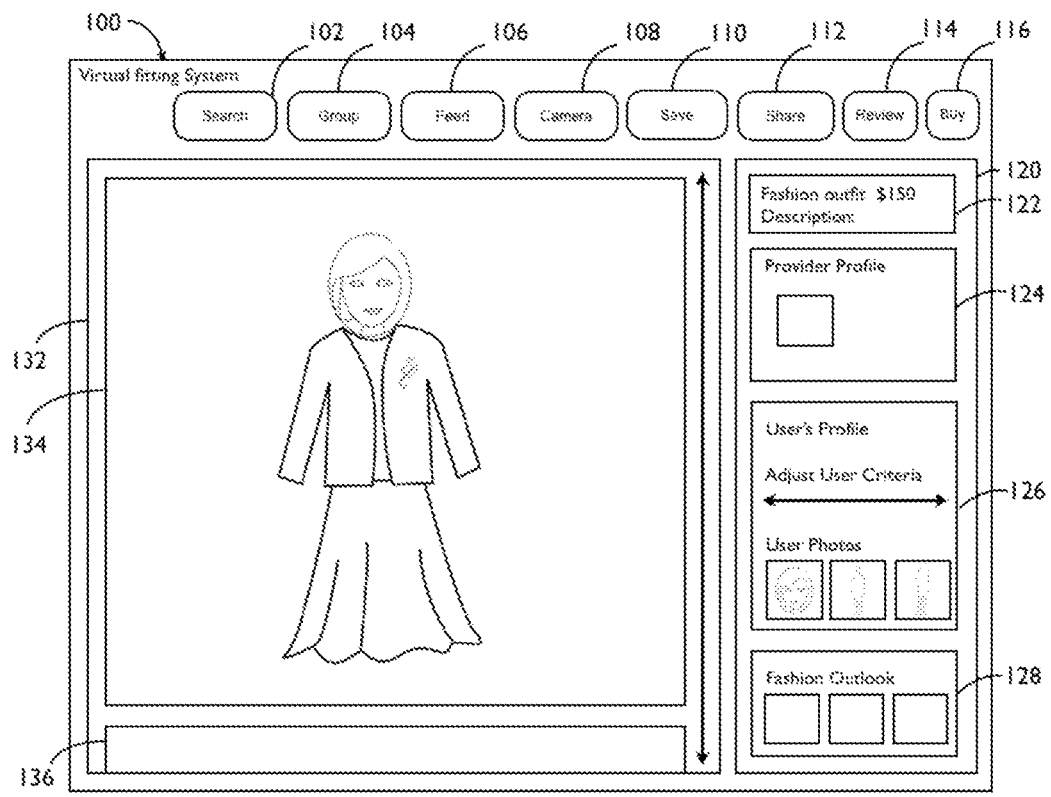
FIG. 1 is a diagram for a preferred embodiment of the implementation of the virtual fitting system.

While the present invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principles of the invention as described herein are contemplated as would normally occur to one skilled in the art to which the invention relates.

With reference to FIG. 1, an embodiment for implementation of a virtual fitting system, such as virtual fitting system 100. For this implementation of the virtual fitting system 100, the user interaction is handled through the touch screen display. User creates her profile and uploads her photos into said system 100. User can also take picture of herself by click on the camera button 108 of said system 100.

She then input her preferences that includes but not limited to her size, colors and styles she likes, outfits she is looking for, and etc into said system 100. Said criteria can be viewed and adjusted on user's profile panel 126 on the touch screen device 100. She use said virtual fitting system 100 to process and adjust her photos, and set the placeholders for adding and placing images of virtual try-on outfits on top of her photos. She then save said placeholders, settings, preferences and etc. by clicking on the save button 110.

Said user searches for outfits that she likes by clicking on the search button 102, or browsing through the outfits displayed on the fashion outlook panel 128. She also searches for groups that have fashion styles and preferences that she likes by click on the group button 104. She can then select to follow group(s) that she likes if she wants to receive outfitting items, experiences and/or services from said group(s).

User receives virtual outfit items and outfitting results from the groups that she is following using said system 100. Said outfitting results are displayed on the feed panel 132 when user clicks the feed button 106. Said feed panel 132 displays a plurality of virtual outfitting results, showing user wearing different outfits. User can browse the virtual outfitting result images by scrolling through the list of images on the touch screen display area 132. Said virtual outfitting results 134 and 136 are provided by the provider(s) and/or group leader(s) of the groups that said user is following using said system 100.

Detailed information of said outfit 134 is display on the user interface 122 of said system 100. User can view the details of said outfit 134 including its price, designer information, source, descriptions and etc.

The information of the provider and/or group leader who provides said outfit 134 is displayed on the provider profile panel 124. Said user can view information related to said provider, including provider's experience, education, related styles, designs and etc through said provider profile panel 124.

If said user likes an outfit 134 displayed in her feed 132, she can share said outfit 134 with other people by clicking on the share button 112. Said user can also input her review, comment and/or communicated with the provider regarding said outfitting image 134 by clicking on the review button 114. Said user can also order and/or purchase said outfit 134 by clicking on the buy button 116.

Figure 2:
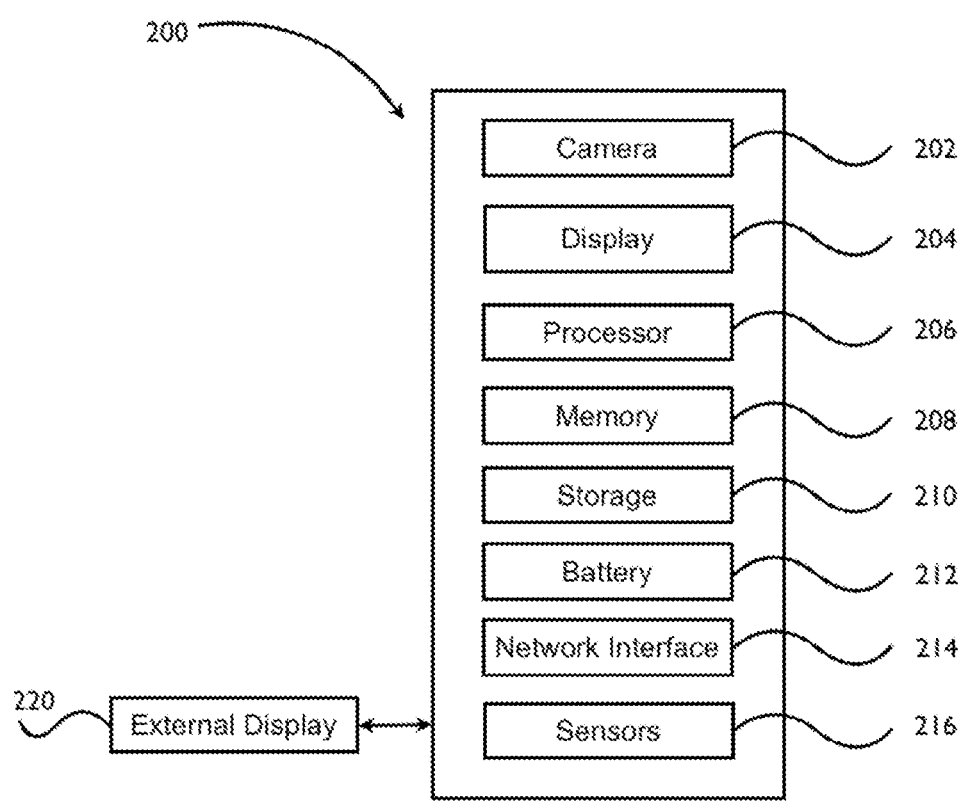
FIG. 2 is a block diagram of a virtual fitting system according to one embodiment of the invention.

With reference to FIG. 2, an embodiment of a virtual fitting environment for implementing the embodiments described herein includes a virtual fitting system, such as virtual fitting system 200. Any and all components of the virtual fitting system may execute as or on a touch screen mobile device such as a mobile phone and tablet, a touch screen TV with computation capability, a computer system, and/or other possible multimedia devices with computation capability. As such, a basic virtual fitting system applicable to all these environments is described hereinafter.

In its most basic configuration, virtual fitting system 200 comprises at least one processing unit or processor 206 and system memory 208, a camera 202, a touch screen display 204. In embodiments, data and images are loaded into memory 208 and executed by the processing unit 206 from system memory 208. Depending on the exact configuration and type of system 200, memory 208 may be volatile (such as RAM), non-volatile (such as ROM, flash memory, etc.), or some combination of the two.

Additionally, virtual fitting system 200 may also have other components. For example, virtual fitting system 200 includes additional media storage 210, such as removable and/or non-removable media storage, including, but not limited to, SD memory card, magnetic or optical disks or tape. Virtual fitting system 200 may have battery 212 to provide power when not connected to an external power source.

The display may be embedded with touch sensors, thus function as a touch screen display 204. The virtual fitting system 200 may have network interface component 214, which handles the transfer of image and data to and/or from other devices, systems and/or networks.

Virtual fitting system 200 may have sensor component(s) 216, such as touch sensor, light sensor, GPS sensor, near field communication sensor and/or etc to handle the sensing, receiving, processing and transferring of data.

Virtual fitting system 200 can use an external display 220 to provide better visualization result; such external display 220 can be a TV, a projector device and/or etc. The external display 220 may be connected with the virtual fitting system 200 through wiring or wireless connections including but not limited to Wi-Fi, bluetooth connection and/or etc.

Figure 3:
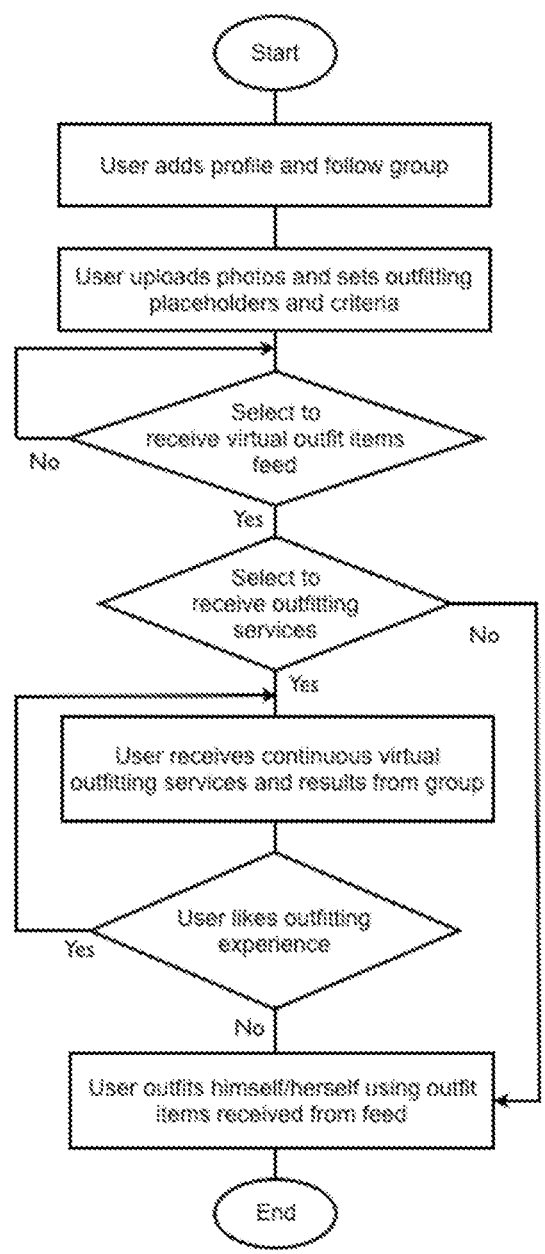
FIG. 3 is a flowchart that shows the sequence of the processes of a user add profile, follow a group and receives continuous feeds of virtual outfitting items, experiences and/or services from said group using said system.

With reference to FIG. 3, user creates a user profile, upload his/her photos, adjust and set placeholders for virtual outfits using virtual fitting system 100. Said user finds the group(s) he/she likes and follow said group(s). Said user selects whether he/she wants to receive virtual try-on items from said group, and defines the criteria of the types of try-on items they would like to receive. Said user also selects whether he/she would like to receive outfitting services from the provider(s) and/or group leader(s) of said group. If said user selects to receive virtual outfit items feed, he/she will receive a continuous feed of virtual try-on items from said group, which he/she can use to virtually outfit himself/herself using said system 100. If said user selects to receive virtual outfitting experience(s) and/or service(s) from said group, he/she will receive a continuous feed of outfitting result images showing him/her wearing various outfits. Said outfitting result images, experience(s) and/or service(s) are provided by the provider(s) and/or group leader(s) of said group. Said user can choose to continue to receive the feeds, or he/she can choose to stop receiving the feeds, or unfollow said provider(s) and/or group.

Figure 4:
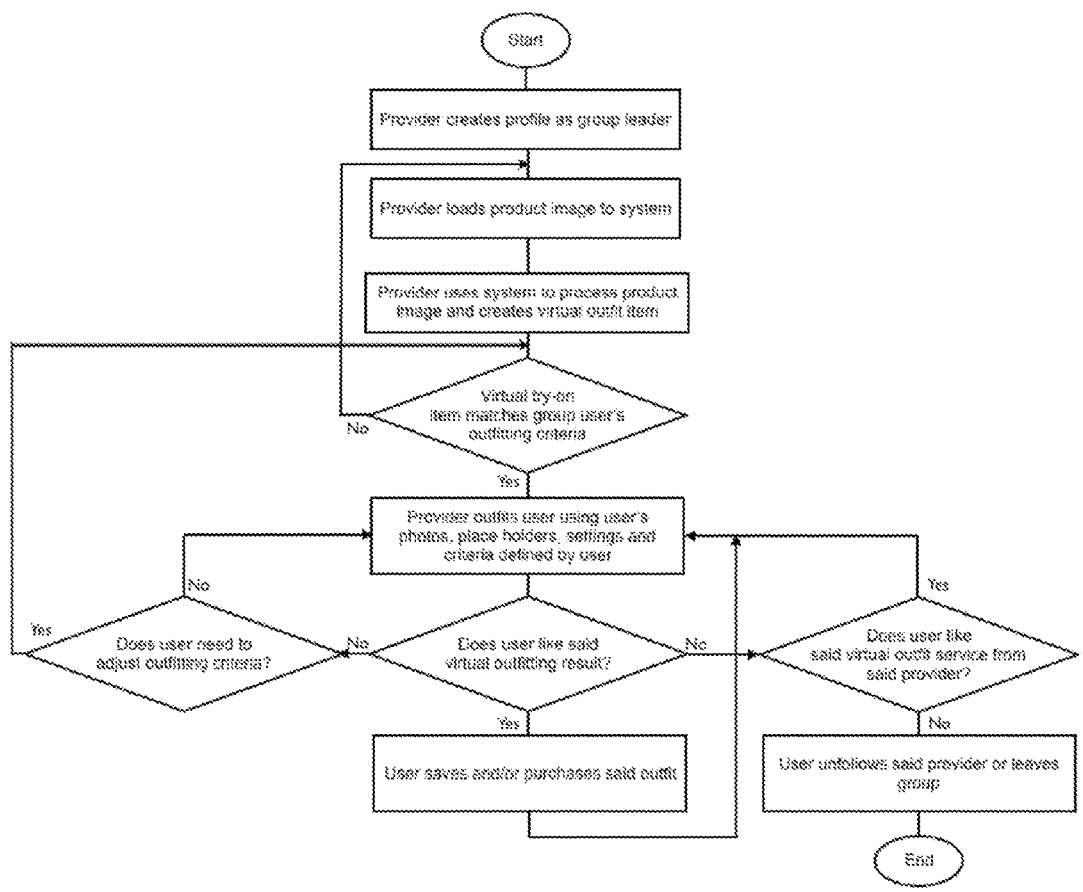
FIG. 4 is a flowchart that shows the sequence of the processes of a provider creates profile as a group leader of a group, creates virtual try-on items, and provides virtual outfitting items, experience and/or service for user of said group, and user's actions toward said virtual outfit result and service.

With reference to FIG. 4, a provider creates his/her provider and/or group leader profile. One or a plurality of providers can create a group. Said provider loads his/her product image and use said system 100 to process the image and create virtual try-on item from said loaded product image. Said provider also add in detailed information regarding said outfit item, including its pricing, source, description, available colors, sizes and etc into said system 100.

Said provider search said group in which he/she is a group leader, finds the user(s) who are looking for similar virtual try-on outfit item, who have defined user criteria that fits what said provider is offering. Said provider add said newly created try-on item to the virtual try-on items feed of said group, distribute said newly created outfit item to said selected users using said data feed.

Said provider also finds the users who want to receive such virtual outfitting experience and/or service. Said provider use said system 100 to simultaneously add his/her virtual outfitting item on top of said selected users' photos, creating the visual result of said users wearing the outfit item he/she is offering.

Said provider save said visual results as images, and distribute said custom outfitting images to each individual users simultaneously using said system 100. Said individual user receives said virtual outfitting result image that is custom created for him/her by said provider on their feed display panel 134. Said user reviews said outfitting result image 504, and decides whether said outfit is a good fit for him/her FIG. 6. Said user can leave review, feedback or communicate with provider regarding said outfit and/or outfitting experience. Said user can also decides whether to update his/her criteria, continue follow or unfollow said provider and/or group.

Figure 5:
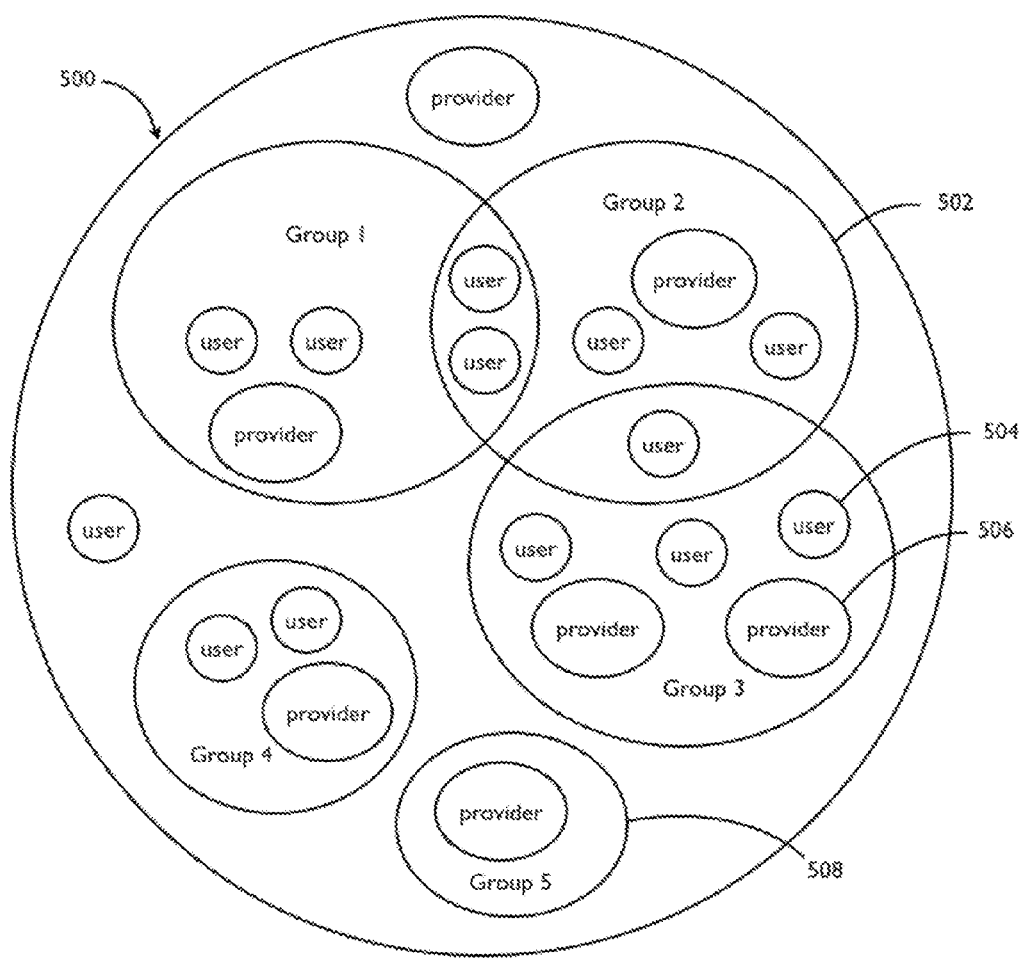
FIG. 5 shows a diagram of the relationship between groups, users and providers within said peer virtual fitting system.

With reference to FIG. 5, a peer virtual fitting system 500 has a plurality of groups 502. Each group has a plurality of providers 506. Each group can have zero or a plurality of users 504. A provider can select to offer virtual outfitting items and/or virtual outfitting experiences and/or services to said groups in which he/she is a provider and/or group leader. A provider can select to create group 508 that only showcase styles, images and/or information, but does not provide any outfitting services and/or feeds, and/or does not have any user follower.

Figure 6:
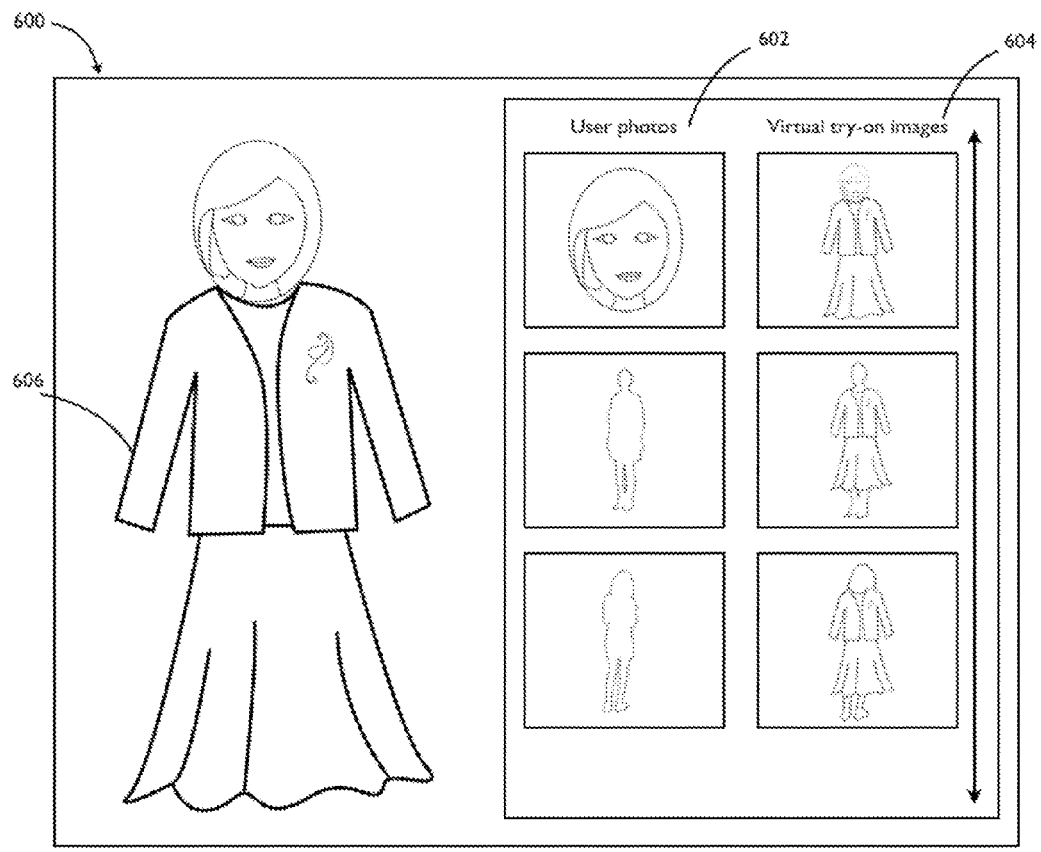
FIG. 6 shows a diagram of that shows a user reviews a plurality of virtual outfitting results offered by a plurality of provider(s) using said virtual fitting system.

With reference to FIG. 6, A individual user receives said virtual outfitting result image that is custom created for him/her by a plurality of provider(s) on his/her graphical feed display area 600. Said virtual outfit results 604 are created by a plurality of providers who offer virtual outfitting item(s) and experience(s). Said virtual outfit results 604 are rendered by said system by modifying and/or editing photo(s) of said user(s) 602 with image(s) of virtual try-on item(s) 606, using users' placeholder setting(s) and preset criteria.

Said user reviews said outfitting result image(s) 604, and decides whether said outfit is a good fit for him/her FIG. 6. Said user can leave review 114, rate, feedback or communicate with provider(s) regarding said outfit and/or outfitting experience. Said user can also decides whether to update his/her criteria, continue follow or unfollow said provider and/or group.

Figure 7:
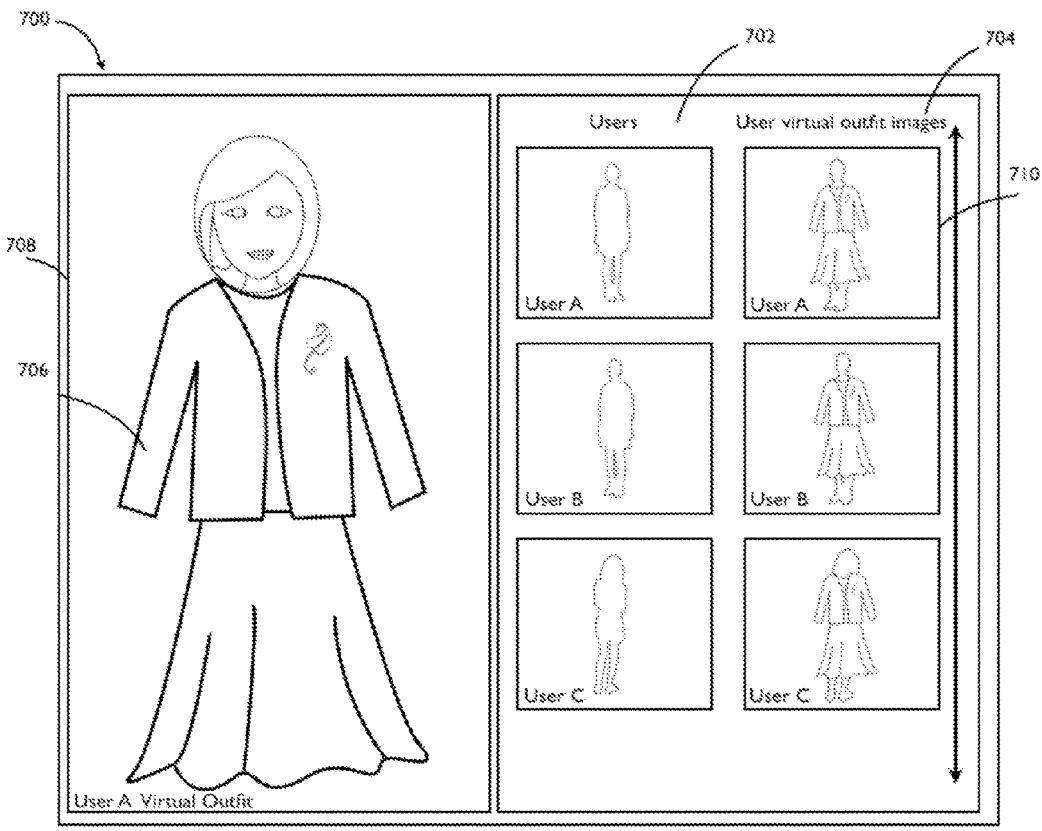
FIG. 7 shows a diagram of that shows a provider simultaneously virtually outfitting a plurality of selected users using said virtual fitting system.

With reference to FIG. 7, Said provider search said group in which he/she is a group leader, finds the users who are looking for virtual try-on outfit item(s) that he/she is offering, who also have predefined user criteria that fits his/her criteria. Said provider using said virtual fitting system 700 to simultaneously virtually outfitting a plurality of users in group(s), by modifying and/or editing photo(s) of said users 702 with image(s) of virtual try-on item(s) 706, using users' placeholder setting(s) and criteria, and simultaneously creating and generating outfitting images 704 showing said users wearing said outfit.

Said provider may click on individual virtual outfit result 710, display said result on a larger graphic display area 708, further exam the details of said virtual outfit result for said user 708, and decides whether said virtual outfitting item(s) is a good fit for said user. Said provider may save a plurality of virtual outfitting result(s) using said system, and distributing said a plurality of virtual outfitting result(s) to said related individual users simultaneously.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

Although the invention is described herein with reference to the preferred embodiment, one skilled in the art will readily appreciate that other applications may be substituted for those set forth herein without departing from the spirit and scope of the present invention.

What is claimed is:

1. A system for provider(s) to offer peer virtual fitting experience(s) and service(s), to a plurality of user(s) in group(s), comprising:
    a. component(s) to display virtual outfitting item(s) and/or image(s) to user(s) and receive user inputs; and
    b. component(s) to store and manage said image(s) and data in network component(s), cloud storage(s); and media storage; and
    c. means for said user(s) to upload and manage photo(s), set placeholders on said photo(s) for virtually outfitting items, and/or define the way(s) they would like to be outfitted with, including the type(s) of virtual outfitting item(s), and/or kind(s) of outfitting experience(s) and/or service(s) they would like to receive in said system; and
    d. means for said user(s) to search, discover, find and join group(s) that offers virtual outfitting item(s), experience(s) and/or service(s) that fits said user(s)' criteria; and
    e. means for said provider(s) to create provider's profile and group(s), set and define criteria for said group(s), including but not limited to: style(s), pricing(s), brand(s), source(s), provider(s), geographical location(s), and preference(s), and
    f. means for said provider(s) to manage and process image(s), create and add virtual outfitting item(s), offering virtual outfitting experience(s) and/or service(s) to user(s) in said group(s); and
    g. means for said provider(s) to simultaneously virtually outfitting a plurality of user(s) in group(s), by modifying and/or editing image(s) of said user(s) with image(s) of virtual try-on item(s), using users' placeholder setting(s), presets and/or other criteria, and
    h. means for said user(s) to review, comment, like, dislike, and share their feedback and input(s) with said provider(s) and/or other user(s) in said group(s); and
    i. means for said user(s) to add, modify and/or redefine the criteria they would like to be outfitted with; and
    j. means for said user(s) to select, follow and/or receive continuously outfitting image(s) and service(s) from said provider(s); and
    k. means for said user(s) to unfollow provider(s), group(s) and/or outfitting experience(s) and/or service(s) offered by said provider(s) and/or group; and
    l. means for said system to organize, maintain and manage a plurality of said user(s), provider(s), group(s), experience(s), service(s) and relationship(s), as a self-sustaining peer virtual outfitting community.

2. The system for offering and receiving peer virtual fitting experience(s) and service(s) in accordance with claim 1, further comprising the means for said user(s) to continuously receive virtual outfitting image(s), experience(s) and/or service(s) from said provider(s) through data, image and/or multimedia information data feeds.

3. The system for offering and receiving peer virtual fitting experience(s) and service(s) in accordance with claim 1, further comprising the means for said provider(s) to provide and deliver outfitting image(s), experience(s) and/or service(s) to a plurality of group(s) of user(s) in a continuous way through data, image and/or multimedia information data feeds.

4. The system for offering and receiving peer virtual fitting experience(s) and service(s) in accordance with claim 1, further comprising initiating means for said provider(s) to create and add virtual try-on item(s) to said system, adjust said try-on item(s) using predefined criteria and/or setting(s), offer variation of said try-on item(s), simultaneously creating, rendering, delivering, and/or distributing customizable outfitting image(s), experience(s) and/or service(s) to group(s) of user(s).

5. The system for offering and receiving peer virtual fitting experience(s) and service(s) in accordance with claim 1, further comprising initiating means for means for said user(s) to receive and view said virtual outfitting image(s), experience(s) and or service(s) custom designed and/or made for himself/herself by said provider(s), and/or send feedback to said provider(s).

6. The system for offering and receiving peer virtual fitting experience(s) and service(s) in accordance with claim 1, further comprising initiating means for said user(s) and/or provider(s) to share said outfitting item(s), image(s), and/or group(s), along with message(s), data, website address, url links, user interface components such as button(s) and link(s), through social media networks and/or other data communication channels.

7. A system for offering and receiving simultaneous virtual fitting experience(s) and service(s) in accordance with claim 1, further comprising initiating means for said shared outfitting image(s), message(s) and/or file(s) are embedded with data, links, buttons and/or other clickable element(s); so that upon receiving said invitation message(s) and/or file(s), other users can click on them, to open, view, follow and/or join said virtual outfitting group(s).

8. The system for offering and receiving peer virtual fitting experience(s) and service(s) in accordance with claim 1, further comprising initiating means for said provider(s) to sell products and/or services, request survey, inquiry user feedback, seek customization request(s) and/or orders from user(s) through said system.

9. The system for offering and receiving peer virtual fitting experience(s) and service(s) in accordance with claim 1, further comprising initiating means for said user(s) to purchase products and/or services, enter customization request, redesign item(s), enter review(s), comment(s) and feedback and/or communicate with provider(s) through said system.

10. The system for offering and receiving peer virtual fitting experience(s) and service(s) in accordance with claim 1, further comprising initiating means for said system to generate reports for data received, processed and managed on said system.

11. The system for offering and receiving peer virtual fitting experience(s) and service(s) in accordance with claim 1, further comprising initiating means for said system to manage the information, locate and display local service providers that can provide customized services to fulfill said user(s)'s selected outfitting choice using said system.

12. The system for offering and receiving peer virtual fitting experience(s) and service(s) in accordance with claim 1, further comprising initiating means for said system to facilitate user(s) request pricing quotes, pre-order, and/or place order(s) with service provider(s) for the customized order and/or services for his/her selected outfit.

13. The system for offering and receiving peer virtual fitting experience(s) and service(s) in accordance with claim 1, further comprising initiating means for said system to facilitate service provider(s) to request and receive bookings, orders, prepayment, payment and/or purchases from users for the customized services of his/her selected outfit, and/or means for said system to interact with or be part of a point of sale system.

14. The system for offering and receiving peer virtual fitting experience(s) and service(s) in accordance with claim 1, comprising:
   a. components) to display virtual outfitting item(s) and/or image(s) to user(s) and receive user input(s);
   b. means for user(s) to take/capture picture(s) using camera, upload and manage photo(s), use said system to create computer generated visual graphic image result(s) showing said virtual outfitting item(s) situated inside of their personal environment, and/or he/she wearing said virtual outfitting item(s), in said computer generated graphic image(s); and
   c. means for user(s) to upload and manage photo(s), definite the way(s) they would like to be outfitted with, using the virtual outfitting item(s), outfitting experience(s) and/or service(s) make available in said system; and
   d. means for provider(s) to manage and process image(s), generate virtual outfitting item(s), create outfitting image(s) for user(s), and/or offering outfitting experience(s) and/or service(s) using said system; and
   e. means for said user(s) to browse through a plurality of virtual outfit item(s) and/or outfitting image(s), created and offered by one and/or a plurality of provider(s); and
   f. means for said user(s) to select, follow and continuously receive outfitting image(s), outfitting experience(s) and/or service(s) from said provider(s); and
   g. means for said user(s) to review, comment, like, dislike, share, follow, unfollow provider(s) and/or outfitting image(s) and/or service(s) offered by said provider(s); and
   h. means for said provider(s) and user(s) to be associated in like-mind groups on said system, offering and sharing their preferred kind(s) of virtual fitting experiences, based on their personal preferences and/or styles
   i. means for said system to organize, manage and maintain a plurality of said virtual outfitting item(s), image(s), data, provider(s), user(s), relationship(s) and/or preferences, as a self-sustaining peer virtual outfitting community.

15. The system for offering and receiving peer virtual fitting experience(s) and service(s) in accordance with claim 1, comprising:
   a. a display;
   b. a memory; and
   c. a camera; and
   d. a processor, operatively coupled to the display, the memory and the camera; and
   e. an application stored in the memory and executable on the processor, for handling user interaction, process and managing the image(s) and/or data.

16. The system for offering and receiving peer virtual fitting experience(s) and service(s) in accordance with claim 1, further comprising sensors such as touch sensors that are embedded in a touch screen display; and/or internal or external storage to store the data; and/or network interface for connecting with other systems through a wireless or wiring network.

17. The system for offering and receiving peer virtual fitting experience(s) and service(s) in accordance with claim 1, wherein said virtual fitting image(s), experience(s) and/or services are arranged in a sequence, rendering a slide-show and/or animation result.

18. The system for offering and receiving peer virtual fitting experience(s) and service(s) in accordance with claim 1, wherein said provider(s) and user(s) are changeable and/or inter-exchangeable roles, a user can be a provider for other user(s) in other group(s), while a provider can be a user in other group(s).

19. The system for offering and receiving peer virtual fitting experience(s) and service(s) in accordance with claim 1, wherein said virtual outfitting experience(s) and service(s) are including but not limited to virtual interior design and/or home decoration service(s), landscape design service(s), wall art rendering and/or design service(s), and building decoration service(s), personal styling service(s) and personal shopping service(s).

20. The system for offering and receiving peer virtual fitting experience(s) and service(s) in accordance with claim 1, wherein said virtual outfitting experience(s) and service(s) are used for user(s) and/or provider(s) to exchange and/or share fashion, apparel, outfit(s) and/or virtual outfitting item(s), experience(s) and/or service(s).

21. The system for offering and receiving peer virtual fitting experience(s) and service(s) in accordance with claim 1, wherein said virtual outfitting experience(s) and service(s) are used as part of social media campaign(s), public relationship campaign(s), marketing campaign(s), sales campaign(s), contest(s), and offering(s).

22. The system for offering and receiving peer virtual fitting experience(s) and service(s) in accordance with claim 1, further comprising the means for users of said group(s) to find and elect user(s) who has outstanding taste, style, or favored by many members of the group, and promote them as group leader(s); said group leader(s) can recommend virtual outfit item(s), experience(s), service(s) and resources to members of said group, and receive privilege and/or rewards as group leader(s).

\* \* \* \* \*